United States Patent [19]

Wallace

[11] Patent Number: 4,686,859
[45] Date of Patent: Aug. 18, 1987

[54] LOAD INDICATING MEMBER, APPARATUS AND METHOD

[75] Inventor: Paul Wallace, Furlong, Pa.

[73] Assignee: SPS Technologies, Newtown, Pa.

[21] Appl. No.: 926,309

[22] Filed: Oct. 31, 1986

Related U.S. Application Data

[63] Continuation of Ser. No. 670,260, Nov. 12, 1984.

[51] Int. Cl.⁴ ............................................. G01L 1/04
[52] U.S. Cl. .................................................. 73/761
[58] Field of Search ................ 73/761, 862.21, 862.23

[56] References Cited

U.S. PATENT DOCUMENTS

| | | | |
|---|---|---|---|
| 2,503,141 | 4/1950 | Stone | 73/761 |
| 2,562,831 | 7/1951 | Stone | 73/761 |
| 2,995,033 | 8/1961 | Stifano | 73/761 |
| 3,248,923 | 5/1966 | Blakeley | 73/761 |
| 3,799,108 | 3/1974 | Mosow | 73/761 |
| 3,943,819 | 3/1976 | Charron | 73/761 |
| 4,525,114 | 6/1985 | Hirst | 73/761 |

Primary Examiner—Anthony V. Ciarlante
Attorney, Agent, or Firm—Stephen Krefman; Aaron Nerenberg

[57] ABSTRACT

A method of measuring the load in a member subjected to longitudinal stress, a load measuring device and a fastener tightening device using the method of measuring, a load indicating member and a load indicating fastener for use in conjunction with the method of measuring, a method of making the load indicating fastener, and a method of tightening the load indicating fastener. A preselected end of a pin is secured to a shank of a load indicating member, such as a load indicating fastener, in a manner such that the pin is unaffected by the elastic deformation of the shank in response to longitudinal stress. Coplanar first and second flat surfaces are formed, respectively, adjacent to the longitudinal ends of the pin and the shank furthest from the preselected end of the pin such as to provide reference surfaces for the measurement of the elongation of the shank in response to longitudinal stress.

27 Claims, 8 Drawing Figures

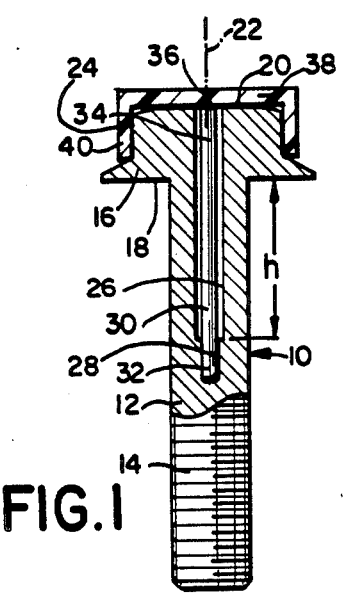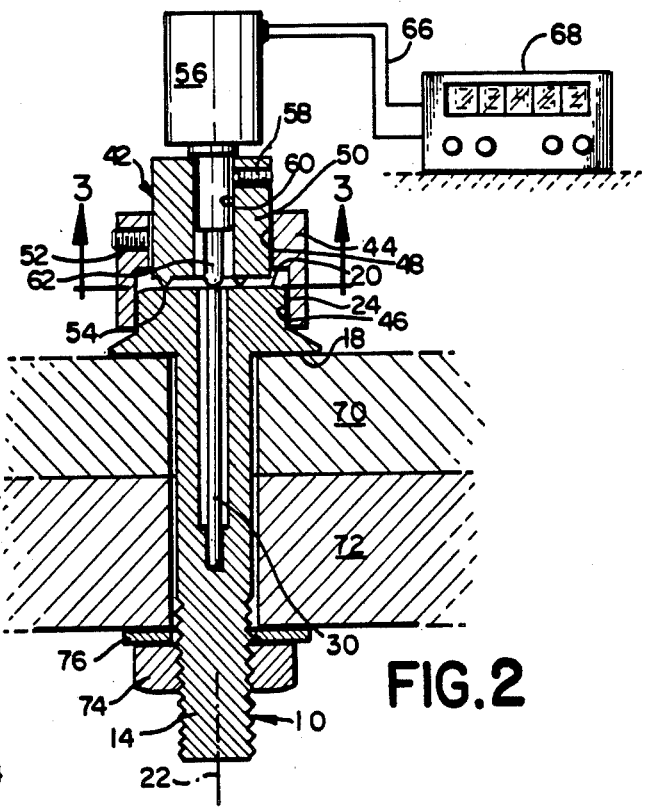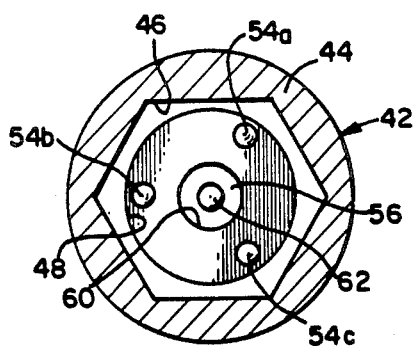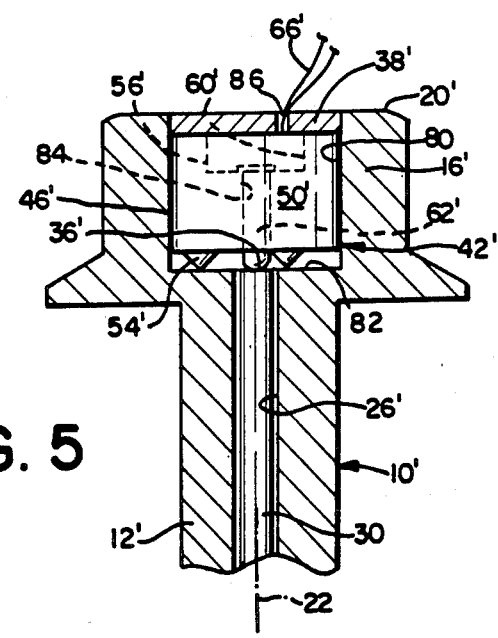

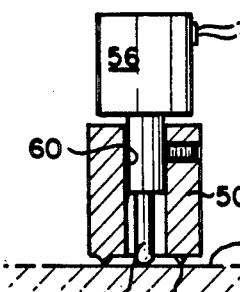
FIG. 4
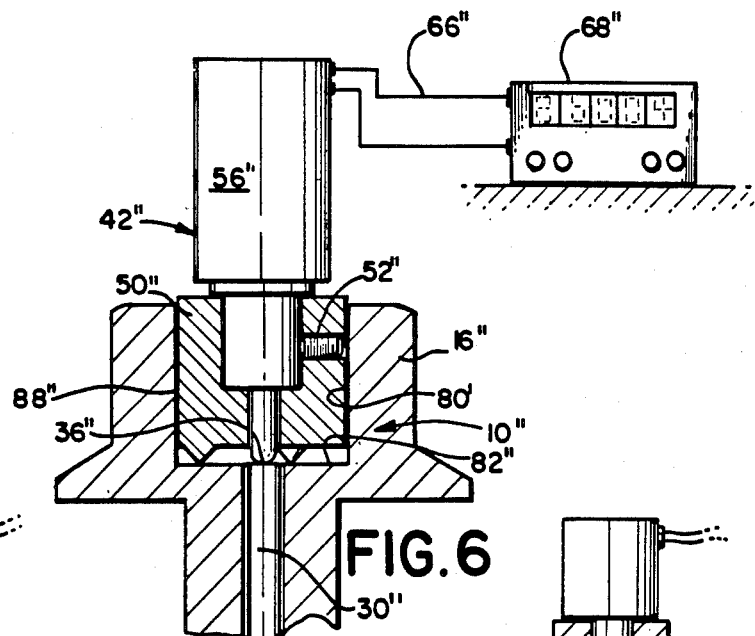
FIG. 6
FIG. 7
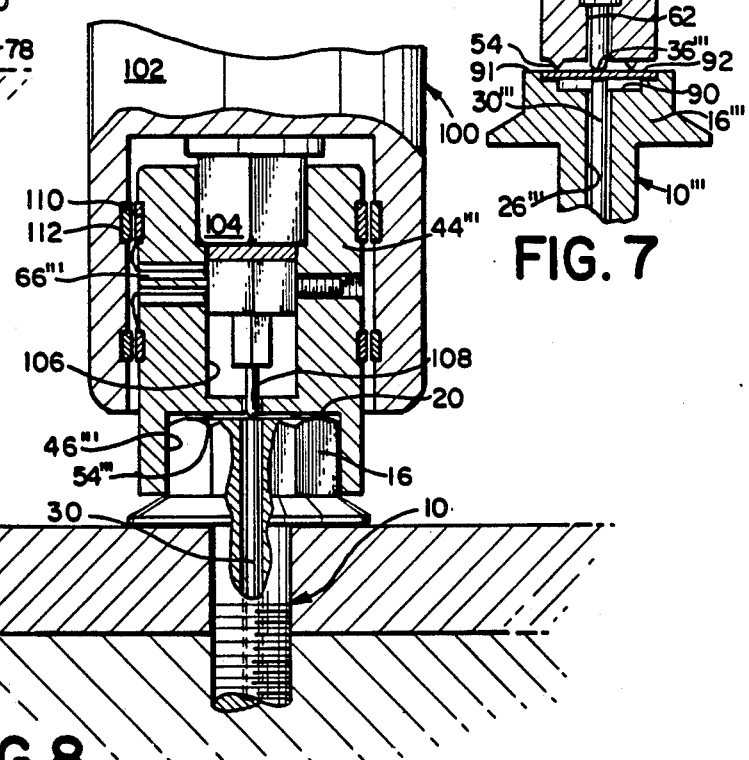
FIG. 8

LOAD INDICATING MEMBER, APPARATUS AND METHOD

CROSS REFERENCE TO RELATED APPLICATIONS

The present application is a continuation of my copending application Ser. No. 670,260, now allowed, filed Nov. 12, 1984.

BACKGROUND OF THE PRESENT INVENTION

The present invention relates to load indicating members and load indicating fasteners and further relates to methods and apparatuses for making and using load indicating members and load indicating fastening members. More particularly, the present invention relates to a method of measuring a load in the load indicating member, a load measuring device using the method of measuring the load, a fastener tightening tool for tightening a load indicating fastener member using the method of measuring, a load indicating member and a load indicating fastener for use in conjunction with the method of measuring, a method of making the load indicating fastener, and a method of tightening the load indicating fastener.

In many operations, it is desirable to determine the amount of load experienced by a longitudinally stressed member. This information is particularly useful when the longitudinally stressed member is a fastener since the measurement of the longitudinal stress provides a verification of the existence of a proper joint.

A prior technique which has been used to indicate the amount of longitudinal stress experienced by a fastener is to provide a load indicating feature to the fastener itself. This may be done by interconnecting one end of an elongated member to a portion of the fastener prior to the installation of the fastener. The elongated member extends parallel to the fastener and is unaffected by the elastic deformation of the fastener in response to longitudinal stress. The free end of the elongated member therefore provides a reference for indicating the elongation of the fastener in response to the longitudinal stress.

Typically, the elongated member is a pin received within an elongated bore disposed longitudinally of the fastener and extended from the head of the fastener and partially through the shank of the fastener. One end of the pin is interconnected with the shank of the fastener at the base of the bore by means, for example, of adhesives, threads, or an interference fit.

The various prior load indicating members and load indicating fasteners differed greatly in structure as well as in the methods and apparatuses with which they were used to provide an indication of the elongation of the load indicating member or fastener.

For example, in the U.S. Pat. No. 3,602,186 issued Aug. 31, 1971 to Charles H. Popenoe, a fastener of this type is taught wherein the free end of the pin is disposed within a recess formed in the head of the fastener and is submerged in a dark fluid filling the recess. A transparent or translucent window is set in the recess to seal against leakage of the fluid and to provide a view of the free end of the pin. When the fastener is in an unstressed condition, the free end of the pin rests flush against the window. As the fastener is stressed longitudinally, the pin moves away from the window, changing the color which is seen through the window and, thereby, providing a visual indication of the elongation of the shank of the fastener. If the fastener later becomes loosened, the indicator window reverts to its original color, providing a visual warning of the loosened condition. A variation of this load indicating fastener is taught by U.S. Pat. No. 3,799,108 issued Mar. 26, 1974 to Jack E. Mosow.

In U.S. Pat. No. 2,413,797 issued Jan. 7, 1947 to Albert R. Stone, a fastener of this type is taught wherein the free end of the pin is provided with a head spaced a predetermined distance away from a preselected surface formed on the fastener. When the fastener is tightened to a preselected longitudinal stress, such as to result in a predetermined amount of elongation, the head of the pin engages the preselected surface of the fastener to provide an indication that the desired elongation has been achieved.

In the similar fastener taught by U.S. Pat. No. 3,248,923 issued May 3, 1966 to Richard H. Blakeley, the free end of the pin is provided with a first predetermined surface which becomes coplanar with a second predetermined surface of the fastener when a preselected stress level is reached. The fastener is calibrated by first being tensioned longitudinally to the desired stress level. Then, either the free end surface of the pin and the adjacent end surface of the head of the fastener are ground simultaneously to become coplanar or, alternatively, the pin is pressed into a reduced diameter bore in the base of the elongated bore until the free end surface of the pin is flush with the adjacent end surface of the head of the fastener. In the unstressed condition of the fastener, the free end of the pin protrudes above the end surface of the head of the fastener. A similar fastener is taught by German Patent-schrift No. 745,925 published Dec. 23, 1943.

In U.S. Pat. No. 3,812,758 issued May 28, 1974 to Robert B. Bessler, Jr. and U.S. Pat. No. 3,823,639 issued July 16, 1974 to Theodore Liber, a cross bar is formed at the free end of the pin which indicates the elongation of the shank of the fastener relative to the elongated pin by torsional deflection.

While the above-referenced seven patents each teach an acceptable structure for providing a visible indication that a preselected amount of elongation has occurred, none of these patents provides for a numerical measurement of the exact amount of elongation which has occurred and none provides for the achievement of different amounts of preselected elongation for alternative installations of the same fastener. Furthermore, none of these patents provides for remote monitoring of the fasteners either during or after installation.

Still another load indicating member and load indicating fastener is taught by U.S. Pat. No. 2,503,141 issued Apr. 4, 1950 to Albert R. Stone. The fastener is modified by providing an extra threaded boss extending from the head of the fastener in the opposite direction than the shank. The free end of the pin is substantially flush with the end of the threaded boss in the unstressed condition. A load measuring device is threaded onto the threaded boss. A plunger reciprocates relative to the load measuring device and engages the free end of the pin. The load measuring device detects when the plunger has moved a predetermined amount relative to the end of the boss such as to indicate that a preselected stress level has been reached. A similar fastener and a similar load measuring device are taught by U.S. Pat. No. 3,943,819 issued Mar. 16, 1976 to Charles S. Charron.

Both Stone '141 and Charron require a substantial modification to the head of the fastener which results in the load indicating fastener protruding further than an unmodified fastener. It is therefore necessary to manufacture the load indicating fasteners independently since it is not practical to modify existing bolts to the configurations taught by either of these patents. Furthermore, neither Stone nor Charron provide inexpensive, quick, and accurate means for aligning the load measuring device with the load indicating member when a measurement is being taken.

Yet other load measuring devices, load indicating members, and load indicating fasteners using pins or similar elongated members to indicate the elongation of the load indicating member or fastener are disclosed in U.S. Pat. No. 2,600,029 issued June 10, 1952 to Albert R. Stone, U.S. Pat. No. 3,908,508 issued Sept. 30, 1975 to William J. Payne; U.S. Pat. No. 3,987,668 issued Oct. 26, 1976 to Charles H. Popenoe; and U.S. Pat. No. 4,114,428 issued Sept. 19, 1978 to Charles H. Popenoe.

While each of the various prior load indicating members, and load measuring devices cited above provides its own load indicating fasteners, advantages in terms of accuracy, ease of manufacture, or ease of reading, none combines all of these advantages in a single structure. For example, none provides a compact load indicating member which may be rapidly and reliably interconnected and accurately aligned with a load measuring device. None provides an accurate load indicating fastener which may be rapidly and inexpensively manufactured from existing fasteners. None provides for the protection of an accurate load indicating member from contamination after installation and between readings. None provides a load measuring device providing an accurate continuous measurement of the elongation of a fastener during installation. Finally, none provides a fastener tightening tool responsive to a load indicating member to provide a precise automatic tightening operation for a fastener.

SUMMARY OF THE PRESENT INVENTION

The present invention provides a load indicating member and a load indicating fastener, as well as methods and apparatuses for the use of the load indicating member and the load indicating fastener, which combine many of the advantages, heretofore only available separately in different load indicating members or fasteners, in a single member or fastener. The present invention further provides additional features and advantages not previously available in load indicating members, load indicating fasteners, load measuring devices, and tightening tools.

The load indicating member of the present invention includes a shank subjected to elastic deformation when stressed longitudinally, a first flat surface formed adjacent to one longitudinal end of the shank, an indicator pin secured to the shank at a location remote from the first flat surface, and a second flat surface formed at the free end of the indicator pin, the second flat surface being substantially coplanar with the first flat surface when the shank is unstressed. The second flat surface provides a reference for the measurement of the elongation of the shank.

A flexible member may be interconnected with both the first and second flat surfaces and extended therebetween such as to form a seal to avoid the contamination of the first and second flat surfaces and to avoid contamination of the region between the indicator pin and the shank of the fastener, which contamination might otherwise reduce the accuracy of the load indication provided by the load indicating member. Alternatively, a removable cover may be fitted across the first and second flat surfaces and interconnected with the load indicating member to seal against contamination before installation of the load indicating member as well as between readings after installation of the load indicating member.

The load indicating fastener of the present invention includes a fastener main body and an indicator pin. The fastener main body has a head formed at one end thereof, a tool engagement surface formed about the perimeter of the head, a shank extending longitudinally from the head, a first flat surface formed adjacent the tool engagement surface, and a first partial bore disposed through the first flat surface and extended partially into the shank. The indicator pin is disposed within the first partial bore and is interconnected with the shank at a location adjacent the base of the first partial bore. The indicator pin includes a second flat surface coplanar with the first flat surface, the second flat surface providing a reference for the measurement of the elongation of the shank of the fastener main body in response to longitudinal stress.

The method of making a load indicating fastener according to the present invention includes the steps of forming a first partial bore through the head and partially into the shank of a fastener main body and interconnecting one end of an indicator pin to the fastener main body at the base of the first partial bore in a manner such that the indicator pin is unaffected by the elastic deformation of the shank. The free end of the indicator pin is provided with a first flat surface that protrudes no further than the head of the fastener main body and is coplanar with a second flat surface formed on or in the head of the fastener main body.

The load measuring device according to the present invention provides a seat member selectively engagable with the first flat surface of the load indicating member, a probe movably interconnected with the seat member and selectively engagable with the second flat surface, and a differential displacement measurement device responsive to the displacement of the probe relative to the seat member such as to provide an accurate measurement of the elongation of the shank relative to the pin when the shank is stressed longitudinally.

The load measuring device may be permanently installed in a recess in the head of the load indicating member or, alternatively, may be removably engaged with the load indicating member by cooperating alignment features of the load measuring device and the load indicating member.

The output of the load measuring device may be used to provide a continuous reading of the instaneous elongation of the fastener or, alternatively, may be used to determine when the fastening operation is complete or to provide an indication of the load in a previously tightened fastener. When the load indicating member is a fastener, the load measuring device may be used simultaneously with a fastener tightening tool or, alternatively, may be incorporated directly into the fastener tightening tool. When the fastener tightening tool incorporating the load measuring device is of an automatic tightening type, the elongation indication in the load measuring device may be combined with other parameters, monitored by the fastener tightening tool, such as angle and torque, to determine when the tightening cycle is complete and to detect irregularities in the joint.

The method of measuring the load in a load indicating member according to the present invention includes the steps of interconnecting a load measuring device of the present invention with a load indicating member of the present invention and measuring the elongation of the shank of the load indicating member relative to the indicating pin thereof.

The method of tightening a load indicating fastener according to the present invention includes the steps of interconnecting a load measuring device according to the present invention to the head of a load indicating fastener according to the present invention, tightening the load indicating fastener while continuously monitoring the load measuring device to determine when a preselected load is reached, and ceasing the tightening of the load indicating fastener when the preselected load is reached, as indicated by the load measuring device.

A primary object of the present invention is to provide an inexpensive and accurate method of measuring the load in the load indicating member, a load indicating device and a fastener driving tool using the method of measuring of the present invention, a load indicating member for use in conjunction with the method of measuring of the present invention, a method of making the load indicating member of the present invention, and a method of tightening the load indicating fastener of the present invention.

Another object of the present invention is to provide an inexpensive method of making a reliable, accurate and compact load indicating fastener from a conventional fastener.

Another object of the present invention is to provide a method and an apparatus for reliably and removably aligning a load measuring device with a load indicating member or fastener and for repeatedly or continuously monitoring the load indicating member or fastener.

Still another object of the present invention is to provide a load indicating member or fastener of the indicator pin-type described above with a means for protecting the indicator pin and for protecting the first and second surfaces thereof from contamination.

Yet another object of the present invention is to provide a load indicating fastener which may be tightened by conventional tightening tools and, more particularly, to provide a load indicating fastener which may be monitored by a load measuring device during a tightening operation.

Still another object of the present invention is to provide a method for providing a continuous indication of the load in a load indicating fastener during a tightening operation or during use of the device to which the fastener is attached.

Still yet another object of the present invention is to provide a fastener tightening device for use in conjunction with a load indicating fastener, which fastener device provides an automatic fastening operation responsive to a measurement of the elongation of the shank of the load indicating fastener relative to an indicator pin during the tightening operation.

These and many other objects, features, and advantages of the present invention will become apparent to those skilled in the art when the following exemplary detailed description of the present invention is read in conjunction with the drawings appended hereto.

BRIEF DESCRIPTION OF THE DRAWINGS

In the drawings, wherein like reference numerals refer to like elements throughout:

FIG. 1 depicts a load indicating member according to the present invention and, more particularly, illustrates a load indicating fastener in an unstressed condition together with a removable protective cap;

FIG. 2 is a partially schematic sectional view illustrating the load indicating fastener of FIG. 1 in an installed condition and further illustrating an example of a load measuring device engaged with the load indicating fastener for measuring the load experienced thereby according to the present invention;

FIG. 3 is a cross-sectional view taken along line 3—3 of FIG. 2;

FIG. 4 is a partially schematic sectional view illustrating a method by which the zero reading of the load measuring device of FIG. 2 may be calibrated;

FIG. 5 is a partially schematic sectional view illustrating an example of a load indicating member according to the present invention incorporating a load measuring device in a recess formed therein;

FIG. 6 is a partially schematic sectional view, of an alternate example of a load indicating fastener and of a load measuring device, each according to the present invention; and FIG. 7 is a partially schematic sectional view of another alternate example of a load indicating fastener and of a load measuring device, each according to the present invention; and FIG. 8 is a partly cut-away partial side view depicting a load indicating fastener according to the present invention as well as a fastener tightening tool engaged therewith, the fastener tightening tool incorporating a load measuring device according to the present invention.

DETAILED DESCRIPTION OF THE PREFERRED EMBODIMENTS

Referring now to the drawings and more particularly to FIGS. 1 and 2 thereof, a first example of a load indicating member, and more particularly, a load indicating fastener 10 is illustrated. The load indicating fastener 10 is formed from a conventional bolt which has been modified to provide an indication of the elongation of the bolt during a tightening operation as well as at various other times during the life of a joint. The bolt has a shank 12 (provided at one of its ends) with threads 14 at one end and (at the other of its ends) with a head 16 at the other end. A shoulder 18 is formed between the head 16 and the shank 12. The head 16 has a generally flat upper surface 20 disposed normal to the longitudinal axis 22 of the shank 12. The head is also provided with a wrenching or tool engagement surface 24, such as a hexagonal wrenching surface, disposed about the periphery thereof.

The bolt is modified to provide a load indicating fastener 10 as follows:

A first bore 26 is provided extending along the longitudinal axis 22 of the bolt and extending from the upper surface 20 thereof partially into the shank 12. A second bore 28 is axially aligned with the first bore 26 and extends downwardly from the base of the first bore. A pin 30 is disposed within the first bore 26. A first end 32 of the pin 30 is pressed into second bore 28 in a manner such as to interconnect the pin 30 with the shank 12 of the load indicating fastener 10. A second end 34 of the pin 30 is disposed adjacent the upper surface 20 of the head 16. It will be appreciated by those skilled in the art that the second end 34 of the pin 30 will be unaffected by any elastic deformation of the shank 12 of the load indicating fastener 10 when the load indicating fastener is longitudinally stressed.

The second end 34 of the pin 30 is provided with a flat upper surface 36 which is coplanar with the upper surface 20 of the head 16. This may be accomplished by pressing the pin 30 into the second bore 28, during installation of the pin, until the upper surface 36 of the pin 30 is properly aligned with the upper surface 20 of the head 16. Alternatively, the upper surface 36 of the pin 30 or the upper surface 20 of the head 16, or both, may be ground after installation of the pin so as to be coplanar.

A protective cover 38 may be fitted onto the head 16 of the load indicating fastener 10 in order to protect the upper surfaces 20 and 36 from contamination and damage during transport, as well as to protect these surfaces after the load indicating fastener has been installed. The protective cover 38 has a flange portion 40 removably engaging the tool engagement surface 24 of the head 16.

A load indicating fastener 10 may be very precisely manufactured so as to provide an accurate measurement, in the manner described below, of the elongation of the shank 12 by locating the base of the first bore 26 a predetermined depth h below the shoulder 18 of the load indicating fastener.

An example of a load measurement device 42 for use in conjunction with the load indicating fastener 10 is depicted in FIGS. 2 and 3. The load measurement device 42 includes a socket member 44 having an internal head engagement surface 46 engagable with the tool engagement surface 24 of the head 16 of the load indicating fastener 10. The socket member 44 aligns the load measurement device 42 with the longitudinal axis 22 of the load indicating fastener 10. The socket member 44 is provided with a bore 48 aligned with a longitudinal axis 22.

Adapter pad 50 is received in the bore 48 and secured in position therein by set screw 52. The adapter pad 50 is provided with a plurality of bosses or legs 54, each of the legs 54 being engagable with the upper surface 20 of the load indicating fastener 10, as illustrated in FIG. 2. Preferably, as illustrated in FIG. 3, there are three legs, 54a, 54b, and 54c disposed in an array about the longitudinal axis 22 to precisely align the adapter pad 50 with the longitudinal axis 22 of the load indicating fastener 10.

As best shown in FIG. 2, the load indicating device 42 includes a differential displacement measurement device 56 having a portion disposed within a bore 60 in the adapter pad 50 and secured in position therein by means of a set screw 58. A probe 62 extends from the differential displacement measurement device 56 into engagement with the upper surface 36 of the pin 30. The differential displacement measurement device 56 is interconnected in a manner well known to the art by suitable wiring 66 to a display device 68 to provide an indication of the position of the probe 62. Various appropriate differential displacement measurement devices are well known in the art and, accordingly, the differential displacement measurement device 56 is not shown or described in detail herein.

In use, the load indicating fastener 10 may be used to secure panels 70 and 72 together by being passed progressively through suitable bores therein and the panels are fastened together by a threaded nut 74 and a washer 76. A suitable tightening tool, not illustrated, engages the tool engagement surface 24 of the load indicating fastener 10 and is rotated to tighten the joint. As the panels 70 and 72 engage, respectively, the shoulder 18 and the washer 76, the shank 12 of the load indicating fastener experiences longitudinal stress causing longitudinal elastic deformation of the shank 12. Since the pin 30 is unaffected by the longitudinal stress, the amount of elongation of the shank 12 can be measured by the load measurement device 42 by measuring the height differential between the upper surfaces 20 and 36, respectively, of the head 16 and the pin 30.

While FIG. 2 illustrates the use of the load measurement device 42 to monitor the condition of the joint at various discrete times, such as before and after the joint is formed or at a predetermined period of time after the joint has been formed, it should be recognized that the load measurement device may be used during the tightening process to continuously monitor the tightening process and, if desired, to determine when the tightening function is complete. This may be done by providing commutator means, not illustrated in FIG. 2 but well known in the art, between the differential displacement measuring device 56 and the wiring 66 so as to facilitate the rotation of the load measurement device 42 during the tightening operation. A handle, also not shown in the drawing, may be interconnected by any suitable means with the socket member 44 so as to provide leverage for the rotation of the socket member and, thereby, to provide means for manually tightening the load indicating fastener 10.

It should be noted that the design of the load indicating fastener 10 described above facilitates rapid modification of existing bolts. It further facilitates the rapid interconnection of conventional differential displacement measuring device 56 therewith since the existing tool engagement surface 24 and upper surface 20 of the bolt is used for interconnection and alignment of the differential displacement measuring device 56. The socket member 44 may be a conventional socket member of the type used with a socket type tightening tool and, accordingly, only the adapter pad 50 needs to be specially manufactured to act as an adapter between the socket member 44 and the differential displacement measuring device 56.

The use of the load indicating fastener 10 and the load measurement device 42, according to the present invention, offers the advantage of improving the repeatability and the reliability of the measurements obtained. Since the upper surfaces 20 and 36 are coplanar when the load indicating fastener 10 is unstressed, there is no need to recalibrate the load measuring device 42 for each installation. Furthermore, it permits the use of a load measurement devices 42 to detect changes in a joint long after the installation has occurred without maintaining records as to how the joint was formed.

A load measurement device 42 according to the present invention may be easily calibrated to provide a zero reading for an unloaded condition as shown in FIG. 4, by the use of a flat reference surface 78. The display device 68 is adjusted in such a manner as to provide a zero reading when the legs 54 of the adapter pad 50 and the probe 62 engage the flat reference surface 78.

An alternate example of a load indicating fastener 10' made from a conventional bolt according to the present invention is illustrated in FIG. 5. The load indicating fastener 10' thereof is provided with a large recess 80 formed in the head 16'. A recessed flat surface 82 is formed in the base of the recess 80, the recessed flat surface 82 being normal to the longitudinal axis 22 of the bolt. The pin 30' is suitably interconnected with the shank 12' at the base of a first bore 26' extending along the longitudinal axis 22 of the load indicating fastener 10'. The upper surface 36' of the pin 30' is disposed in a manner such as to be coplanar with the recessed flat surface 82 when the load indicating fastener 10' is unstressed.

A load measurement device 42' disposed within the recess 80 includes a adapter pad 50' and an external engagement surface 46' engagable with the inner wall of the recess 80. A plurality of legs 54' extend downwardly from the adapter pad 50' into engagement with the recessed flat surface 82.

As shown schematically in FIG. 5, a compact differential displacement measuring device 56', well known in the art, is disposed within a recess 60' formed in the adapter pad 50'. A probe 62' extends from the differential displacement measurement device 56' along a bore 84 in the adapter pad 50'. The free end of the probe 62' engages the upper surface 36' of the pin 30'.

A protective cover 38' is fitted into the recess 80 and is suitably interconnected with the head 16' of the load indicating fastener 10' in a manner such as to secure the adapter pad 50' in the recess 80 and further such as to seal the recess 80 from contaminants. A display device, not shown in the drawing, may be interconnected with the differential displacement measurement device 56' by suitable wiring 66' extending through an apperature 86 in the protective cover 38'.

The load indicating fastener 10' is more expensive to manufacture than the load indicating fastener 10 described previously. However, the load indicating fastener 10' offers the advantage of being completely self-contained except for the display device. The load indicating fastener 10' has the additional advantage that, when a suitable commutator is provided, the measurement of the elongation of the shank 12' may be continuously monitored while the load indicating fastener 10' is being tightened by any conventional tightening tool which permits passage of the wiring 66'. Thus, the tightening operation used in any conventional tightening tool can be controlled or verified using the elongation information obtained from the differential displacement measurement device 56'.

Another variation of a load indicating fastener 10", according to the present invention, is illustrated in FIG. 6. A recess 80" is formed in the head 16" of the load indicating fastener 10" to provide a recessed flat surface 82". The recessed flat surface 82 is coplanar, in the unstressed condition of the load indicating fastener 10", with the upper surface 36" of a pin 30" interconnected with the load indicating fastener 10" in the manner described previously.

In use, an adapter pad 50" is removably insertable in the recess 80". The adapter pad 50" is provided with an outer surface 88 engagable with the recess 80" in a manner such as to axially align the adapter pad 50" with the pin 30". A differential displacement measurement device 56" is interconnected with the adapter pad 50" by means of a set screw 52" and with a display device 68" by means of suitable wiring 66" in a manner similar to that described above for the load measurement device 42.

Yet another example of a load indicating fastener 10''' is illustrated in FIG. 7. The load indicating fastener 10''' is provided with a first recess 90 and a second recess 92 formed in the head 16''' thereof. The second recess 92 is shallower than the first recess 90 and aligned therewith such as to define a shoulder 91 therebetween. A pin 30''' is provided in a bore 26''' in a manner such that an upper surface 36''' is aligned with the shoulder 91. A flexible plate 94 is disposed within the second recess 92 and is interconnected about is perimeter with the shoulder 91. The flexible plate 94 also engages the upper surface 36''' of the pin 30'''. The flexible plate 94 acts as a cover to protect the upper surface 36''' of the pin 30''', the shoulder 91, and the second recess 92 from contamination. A load measurement device 42 of the type described above may be used in conjunction with the load indicating fastener 10''' by engaging the legs 54 of the adapter pad 50 thereof with the portion of the flexible plate 94 which is disposed above the shoulder 91 while engaging the probe 62 with the portion of the flexible plate 94 which is engaged with the pin 30'''.

FIG. 8 illustrates an example of a fastener tightening apparatus 100 adaptable for use in conjunction with a load indicating fastener 10' a load indicating fastener 10", or a load indicating fastener 10''' according to the present invention. In the example of structure illustrated in the drawing, the fastener tightening apparatus 100 is depicted installing a load indicating fastener 10.

The fastener tightening apparatus 100 includes a conventional power tool, only the housing 102 of which is shown in the drawing. The conventional power tool has a rotary output driver 104 engagable with a modified socket member 44''''. The modified socket member 44" has an engagement surface 46''' engagable with the head 16 of the load indicating fastener 10. A differential displacement measurement device 56 is disposed within a cavity 106 formed in the modified socket member 44''''. A plurality of legs 54''' extend from the modified socket member 44''' into engagement with the upper surface 20 of the load indicating fastener 10. The probe 62 of the differential displacement measurement device 56 extends through a suitable aperture 108 in the modified socket member 44''' for engagement with the pin 30 of the load indicating fastener 10. The housing 102 and the modified socket member 44''' are provided, respectively, with cooperating commutation elements 110 and 112 for electrically interconnecting the differential displacement measurement device 56 with the power tool.

It will be appreciated by those skilled in the art that the power tool may be provided with a display device, not shown in the drawing, for displaying the measurement of elongation obtained during the fastening operation. Alternatively, the power tool may be adapted to use the information continuously supplied by the differential displacement measuring device 56 to determine when a predetermined amount of elongation has occurred and when a tightening operation should be stopped.

It will further be appreciated by those skilled in the art that the power tool chosen may, in a manner well known in the art, monitor other characteristics of the joint being formed, such as the torque and the instantaneous angle of the load indicating fastener. An example of such a power tool, may be found in U.S. Pat. No. 4,344,216 issued 8/17/82 to Robert J. Finkelston. This other information available from the power tool may be combined with the elongation information supplied by the modified socket member 44' to provide a precisely controlled tightening operation wherein the various measured parameters are each used directly to control the tightening sequence or to monitor the results of the tightening operation. For example, the modified socket member 44' may be used in conjunction with the power tool using what is known in the art as a "turn of the nut" tightening sequence, while the elongation information is used subsequently to determine whether the joint formed by the tightening sequence meets certain specifications.

The fastener tightening apparatus 100 and the modified socket member 44' thereby facilitate rapid formation of reliable joints having repeatable and predictable characteristics. The fastener tightening apparatus 100 and the modified socket member 44' also provide for a means to detect flaws in a joint during the actual installation process, thus reducing the risk of a catastrophic joint failure.

The above detailed description includes the best mode for carrying out the invention contemplated by the inventor at the time of filing of the present application. It will be appreciated by those skilled in the art that many modifications may be made to the load indicating fastener, the load measurement device, and the fastener tightening apparatus described above without departing from the spirit of the present invention. Such modifications are included within the intended scope of the claims appended hereto.

What is claimed as novel is as follows:

1. A load indicating member comprising:
   a shank, which, when stressed longitudinally, is subject to elastic deformation such that one portion thereof moves relative to another portion thereof;
   a recess formed adjacent one longitudinal end of said shank;
   a first flat surface formed in the base of said recess;
   an indicator pin having one longitudinal end disposed adjacent said first flat surface and an other longitudinal end disposed remote therefrom, said other longitudinal end being secured to said shank at a location remote from said first flat surface, said pin being unaffected by said elastic deformation of said shank; and
   a second flat surface formed at said one longitudinal end of said pin, said second flat surface being substantially parallel with said first flat surface when said shank is unstressed, said second flat surface providing a reference for measurement of the elongation of said shank.

2. The load indicating member of claim 1 further comprising:
   a head formed integrally with said shank at said one longitudinal end thereof adjacent said first flat surface said recess being formed in said head;
   fastening means formed integrally with said shaft at the other longitudinal end thereof remote from said first flat surface;
   a first bore extending longitudinally of said shank and partially through said shank and having an open end disposed adjacent said first flat surface and a base end disposed remote therefrom, said indicator pin being disposed within said first bore; and
   a second bore having a smaller diameter than said first bore, said second bore extending longitudinally of said shank partially through said shank from said base end of said first bore to a location remote therefrom said indicator pin being interconnected with said shank by having one end thereof secured in said second bore.

3. The load indicating member of claim 1 wherein said recess is formed at said first longitudinal end of said shank.

4. The load indicating member of claim 1 further comprising:
   a load measuring device disposed within said recess, said load measuring device having portions respectively engaging said first flat surface and said second flat surface and being responsive to the elongation of said shank relative to said indicator pin such as to provide a measurement of the elongation of said shank.

5. The load indicating member of claim 1 further comprising:
   engagement means formed at said one longitudinal end of said shank for removably positioning a load measuring device relative to said first and second flat surfaces such as to provide a measurement of the elongation of said shank.

6. The load indicating member of claim 5 wherein said engagement means comprises the surfaces of said recess formed in said shank.

7. The load indicating member of claim 5 further comprising:
   cap means removably engagable with said engagement means to protect said load indicating member from debris and contaminants.

8. The load indicating member of claim 1 further comprising:
   a head formed integrally with said shank at said one longitudinal end thereof, said recessed being formed in said head; and
   engagement means formed on said head for positioning a load measuring device relative to said first and second flat surface such as to provide a measurement of the elongation of said shaft.

9. The load indicating member of claim 1 further comprising:
   cap means removably engagable with said elongated shank to close said recess such as to protect said load indicating member from debris and contaminants.

10. A load measuring device for use in conjunction with a load indicating member having a shank, a first flat surface formed adjacent to one longitudinal end of said shank, first engagement means formed at said one longitudinal end of said shank, a pin secured to said shank at a location remote from said first flat surface, and a second flat surface formed on said pin and disposed parallel to said first flat surface, said load measuring device comprising:
    adapter means selectively engagable with said first flat surface;
    probe means movably interconnected with said adapter means, said probe means being selectively engagable with said second flat surface;
    second engagement means selectively engagable with said first engagement means when said load measuring device is used in conjunction with said load indicating member such as to axially position said probe means relative to said pin; and
    measurement means responsive to the displacement of said probe means relative to said adapter means such that said measurement means provides a measurement of the elongation of said shank relative to said pin when said shank is stressed longitudinally.

11. The load measuring device in claim 10 wherein said first flat surface is disposed adjacent one end of said shank and further wherein said pin is disposed in a partial bore passing through said first flat surface, said load measuring device further comprising:

recess means formed in said adapter means, said probe means being reciprocably disposed in said recess means such as to be reciprocable relative to said seat means toward and away from said second flat surface; and feet means extending from said adapter means for engagement with said first flat surface, said feet means being disposed in an array about said recess means such as to position said adapter means on said first flat surface in a manner placing said probe means in axial alignment with said pin.

12. The load measuring device of claim 10, wherein said load indicating member comprises a fastener having a head formed at said one end of said shank, and said first engagement means comprises tool engagement means formed on said head; and further wherein:

said second engagement means of said load measuring device further comprises tool means selectively engagable with said tool engagement means such that said fastener is selectively rotated by rotation of said tool means.

13. The load measuring device of claim 12 further comprising:

interconnection means for interconnecting said tool means with wrenching means such as selectively impart a rotational motion to said fastener to install and to remove said fastener while measuring the elongation thereof.

14. The load measuring device of claim 13 wherein said measurement means provides an output signal indicative of the elongation of said shank and further wherein said load measuring device further comprises:

commutator means for communicating said output signal to said wrenching means.

15. The load measuring device of claim 10 wherein said first engagement means comprises a recess formed in said shank and said second engagement means comprises a portion of said load measurement device engagable with said recess, said first flat surface being disposed at the base of said recess.

16. A method of tightening a load indicating fastener of the type having a shank subject to elastic deformation when stressed longitudinally, a head formed at one longitudinal end of said load indicating fastner, a first flat surface formed adjacent said head, tool engagement means formed on said head adjacent said first flat surface, an indicator pin having one longitudinal end disposed adjacent said first flat surface and an other longitudinal end secured to said shank at a location remote from said head, and a second flat surface formed at said one longitudinal end of said pin, said method comprising the steps of:

simultaneously engaging a tightening tool with said tool engagement means, engaging adapter means with said first flat surface, and engaging probe means with said second flat surface said adapter means being fixedly interconnected with said tightening tool and said probe means being reciprocally interconnected with said adapter means;

operating said tightening tool to tighten said load indicating fastener; and measuring the displacement of said probe means relative to said adapter means such as to provide a continuous measurement of the elongation of said shank during the operation of said tightening tool.

17. The method of claim 16 wherein said step of operating said tightening tool further comprises rotating said tightening tool until the occurence of a condition measured by said tightening tool indicative of a proper joint, said method further comprising the step of:

verifying the existence of a proper joint using the measurement of the displacement of said probe means relative to said adapter means.

18. The method of claim 16 further comprising the step of:

ceasing operation of said tightening tool when said measuring step indicates that a predetermined amount of shank elongation has occurred.

19. A method of measuring the load indicating fastener of the type having a shank subject to elastic deformation when stressed longitudinally, a head formed at one longitudinal end of said load indicating fastener, a first flat surface formed adjacent said head, tool engagement means formed on said head adjacent said first flat surface, an indicator pin having one longitudinal end disposed adjacent said first flat surface and an other longitudinal end secured to said shank at a location remote from said head, and a second flat surface formed at said one longitudinal end of said pin, said method comprising the steps of:

engaging socket means with said tool engagement means, said socket means further comprising leg means engagable with said first flat surface and probe means reciprocably interconnected with said leg means and engagable with said second flat surface; and measuring the position of said probe means relative to said leg means.

20. An adapter for a load measuring device for use in conjunction with a load indicating member having a shank, a first flat surface formed adjacent one longitudinal end of said shank, a pin secured to said shank at a location remote from said first flat surface, and a second flat surface formed on said pin and disposed parallel to said first flat surface, said adapter means comprising:

a main body;

a bore extending through said main body, said bore being adapted to reciprocally receive probe means therein;

interconnection means adapted to interconnect said main body with measurement means responsive to displacement of said probe means relative to said mainbody; and feet means extending from said main body for engagement with said first flat surface, said feet means being disposed in an array about said recess means such as to position said adapter means on said first flat surface in a manner placing said bore in axial alignment with said pin; and further such that, upon interconnection of said measurement means with said main body, and engagement of said probe means with said first flat surface, said measurement means provides a measurement of the elongation of said shank relative to said pin when said shank is stressed longitudinally.

21. The adapter of claim 20 wherein said load indicating member further comprises first engagement means formed at one end of said shank, said adapter further comprising:

second engagement means selectively engagable with said first engagement means when said adapter is used in conjunction with said load indicating member such as to axially position said probe means relative to said pin.

22. The adapter of claim 20 wherein said load indicating member comprises a fastener having a head formed at said one end of said shank, and said first engagement means comprises tool engagement means formed on said head; and further wherein:
said second engagement means of said load measuring device further comprises tool means selectively engagable with said tool engagement means such that said fastener is selectively rotated by rotation of said tool means.

23. The adapter of claim 22 further comprising:
interconnection means for interconnecting said tool means with wrenching means such as selectively impart a rotational motion to said fastener to install and to remove said fastener while measuring the elongation thereof.

24. The adapter of claim 23 wherein said measurement means provides an output signal indicative of the elongation of said shank and further wherein said load measuring device further comprises:
commutator means for communicating said output signal to said wrenching means.

25. An installation tool for installing a load indicating fastener of the type having a shank, a first flat surface formed adjacent to one longitudinal end of said shank, tool engagement means formed at said shank, a pin secured to said shank at a location remote from said first flat surface, and a second flat surface formed on said pin and disposed parallel to said first flat surface, said installation tool comprising:
adapter means selectively engagable with said first flat surface;
probe means movably interconnected with said adapter means, said probe means being selectively engagable with said second flat surface;
second engagement means selectively engagable with said first engagement means when said load measuring device is used in conjunction with said load indicating member such as to axially position said probe means relative to said pin; and
measurement means responsive to the displacement of said probe means relative to said adapter means such that said measurement means provides a measurement of the elongation of said shank relative to said pin when said shank is stressed longitudinally,
tool means selectively engagable with said tool engagement means such that said fastener is selectively installed in a workpiece by engagement of said tool means with said tool engagement means and operation. of said tool means.

26. The installation tool of claim 24 wherein said fastener is installed by rotation of the fastener relative to said workpiece, said tool means imparting rotational motion to said tool engagement means for installation of said fasteners.

27. The installation tool of claim 26 the load measuring device of claim 13 wherein said measurement means provides an output signal indicative of the elongation of said shank and further wherein said load measuring device further comprises:
commutator means for communicating said output signal to said wrenching means.

* * * * *